(12) United States Patent
Pacholok et al.

(10) Patent No.: US 7,557,708 B1
(45) Date of Patent: Jul. 7, 2009

(54) RFID INTERROGATOR/INDUCTION HEATING SYSTEM

(76) Inventors: David Pacholok, 12012 Mohican Trail, Algonquin, IL (US) 60102; Mark T. Elliott, 330 River Bluff Rd., Elgin, IL (US) 60120

(*) Notice: Subject to any disclaimer, the term of this patent is extended or adjusted under 35 U.S.C. 154(b) by 144 days.

(21) Appl. No.: 11/496,683

(22) Filed: Jul. 31, 2006

(51) Int. Cl.
*G08B 13/14* (2006.01)

(52) U.S. Cl. ............... 340/572.1; 340/568.1; 340/10.51; 219/600; 219/627

(58) Field of Classification Search ... 340/572.1–572.9, 340/568.1, 10.1, 825.69, 5.1, 5.9, 5.92, 10.51, 340/10.4; 219/600, 618, 620, 625, 627
See application file for complete search history.

(56) References Cited

U.S. PATENT DOCUMENTS

| | | | | |
|---|---|---|---|---|
| 3,742,178 A | * | 6/1973 | Harnden, Jr. ............. | 219/627 |
| 5,826,982 A | * | 10/1998 | Schieferdecker et al. .... | 374/149 |
| 6,232,585 B1 | * | 5/2001 | Clothier et al. ............. | 219/620 |
| 6,268,723 B1 | * | 7/2001 | Hash et al. .................. | 324/243 |
| 6,320,169 B1 | * | 11/2001 | Clothier ...................... | 219/626 |
| 6,664,520 B2 | * | 12/2003 | Clothier ...................... | 219/634 |
| 6,774,346 B2 | * | 8/2004 | Clothier ...................... | 219/620 |
| 6,953,919 B2 | * | 10/2005 | Clothier ...................... | 219/620 |
| 7,207,486 B1 | * | 4/2007 | Bennett ....................... | 235/385 |

* cited by examiner

*Primary Examiner*—Benjamin C Lee
*Assistant Examiner*—Daniel Previl
(74) *Attorney, Agent, or Firm*—Kajane McManus

(57) ABSTRACT

The system of the present invention deals with an electronically controlled, low cost RFID Interrogator/Induction Heating System which does not require a separate interrogator, rather utilizing components within the system for purposes of interrogation.

7 Claims, 5 Drawing Sheets

RFID INTERROGATOR/INDUCTION
HEATING SYSTEM

FIELD OF THE INVENTION

The invention deals with RFID heating/induction systems. More specifically, the system of the present invention deals with an electronically controlled, low cost RFID Interrogator/Induction Heating System.

BACKGROUND OF THE INVENTION

Recently, the cost of low power induction heating or IH systems (0.01 to 3 KW) has fallen due to advances in semiconductor power switching technology, enabling various commercial and consumer heating applications. Induction heating has the ability to heat metallic or other electrically conductive objects with no wires or other physical contact, as has been advantageously done for years in such applications such as induction cooking.

Another more recent innovation, Radio Frequency Identification or RFID systems, provides remote identification of vehicles on tollways for billing purposes, and identification of palletized items in warehouses so that inventory counting can be easily accomplished. RFID systems fall broadly into several categories such as short range (a few inches usually) or long range (up to many meters), passive (the RF field from the reader or interrogator powers the "tag" on the object), active (containing a battery to power some data transmission mechanism means within the tag).

In addition, RFID systems can not only send out a unique code from Tag to Reader to identify the tagged article, but the Reader can modify the data within the tag to show, for example, that the tag has been read on such and such a date.

RFID tags can also absorb information from the environment in which they are used, such as temperature or humidity, salinity or even blood glucose levels. In this way the RFID system can form an important part of a feedback control loop to regulate such a variable.

One ubiquitous parameter that needs control is the degree of heating (temperature regulation) of materials for various purposes. As IH is a form of no contact or "wireless" electrical heating, RFID systems have cleverly been employed to wirelessly provide feedback as to the temperature of an inductively heated system. U.S. Pat. No. 3,742,178 teaches a system that controls temperature in a cooking vessel by a tag-like device built into a piece of cookware to regulate the temperature thereof, although the cookware is not "identified", per se, by this simple system. More advanced systems as taught in U.S. Pat. Nos. 6,320,169 and 6,664,520, by Clothier, teach temperature control and many other product/system features heretofore unobtainable by use of modern RFID Tag/Reader systems in conjunction with induction heating systems.

OBJECTS OF THE INVENTION

While the cost of some RFID tags has fallen to the fraction of a dollar level, the reader or interrogator as it is sometimes called remains far too pricey for the lowest cost and therefore highest volume consumer heating applications. While a $25.00 reader is no cost issue for a $1000.00 "smart range" as disclosed in U.S. Pat. No. 6,953,919 by Clothier, it is totally out of the question for a $30.00 (retail price) baby bottle warmer. It has been proposed that by farther integration or the use of Application Specific Integrated Circuit or ASIC technology, the reader may even come down to the a $5.00 level including the required antenna and power supply. For the baby bottle warmer example given above, and for countless other high-volume consumer applications that could be enabled by a combination of IH and RFID technology, $5.00 is still totally out of the question, as the normal ratio between component cost and retail price is in the range of 1 to 10. To enable such applications, a full order of magnitude cost reduction for the RFID Reader is required. It should be pointed out that the power conversion technology developed in mass quantity for electronic ballasts has already enabled a 25-40 watt 120 volt line operated induction heater to be built for less than $1.00 in million piece quantities, with higher powered units costing proportionally more, based upon power level.

Therefore, it is an object of this invention to provide such a low cost reader for short range applications. It is a further object to provide a reader that reuses the normal components of the IH system into which it is embedded so as to reduce cost and parts count. It is also an object to use the same electronic controller, such as a microprocessor or programmable IC, etc., that controls the IH system to decode the codes or data provided by the reader from the tag, with or without the code or data containing information about some physical variable, e.g. temperature. It is also an object of this invention to provide an IH system that uses the code or data to control the physical variable such as temperature by controlling the average power delivered by the IH system in response to that data, i.e. closed loop control.

BRIEF DESCRIPTION OF THE DRAWINGS

FIGS. 3A-3E illustrate various functional alternative embodiments of the inverter/RC configuration of FIG. 2 outlined in dashed lines.

DESCRIPTION OF THE PREFERRED EMBODIMENTS

Figure 1:
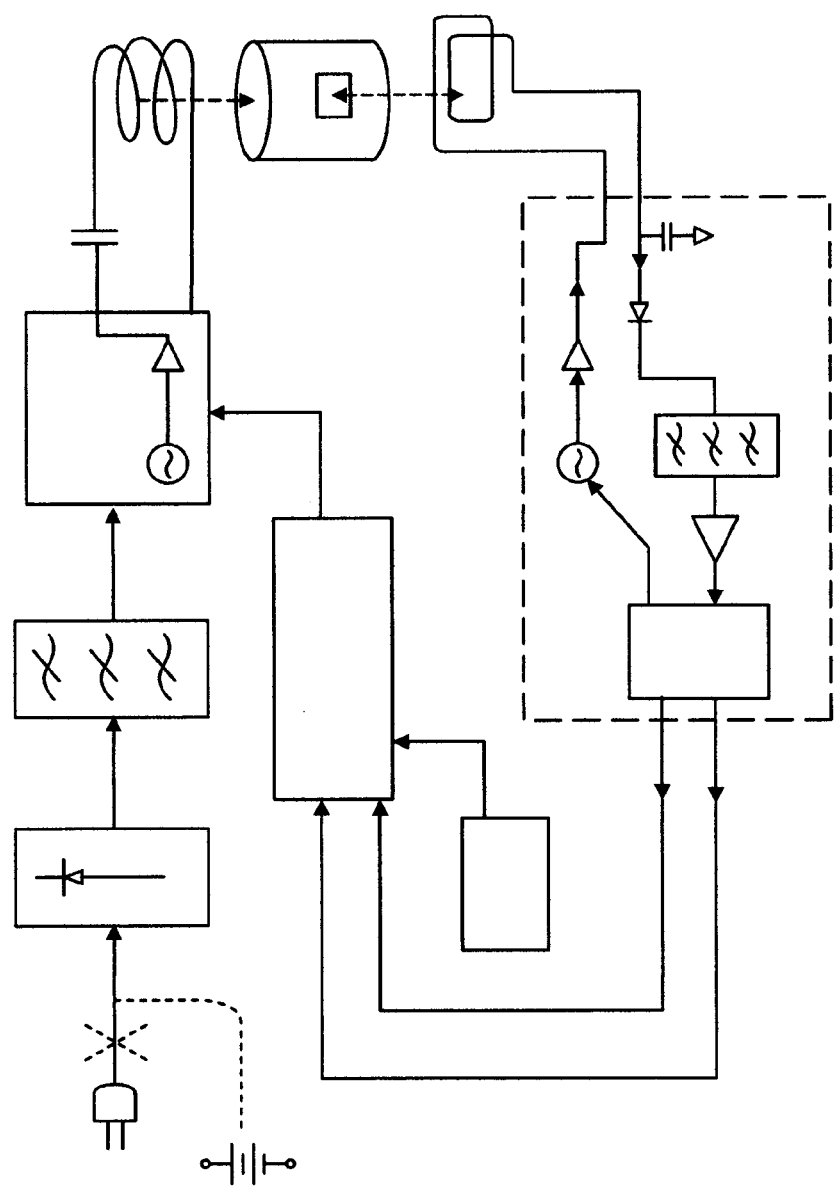
FIG. 1 is a circuit block diagram of a prior art RFID Induction Heating System.

Presently available low cost IH systems operate in the 20-50 KHz range, also shared by most electronic ballasts, to from which they owe their origin. RFID systems generally run at one of several regulatory agency allowed frequencies such as 125 KHz, 13.56 MHz, 902 MHz etc. Of particular interest is the lowest standard frequency, 125 KHz, a frequency somewhat higher than most IH frequencies, but still in the same general range which can be produced with identical circuitry. It has been discovered that if an IH system delivering say 50 watts at 25 KHz is raised in frequency to 125 KHz without making other circuit changes, such as reducing the number of turns within the IH work coil, the power delivered to the susceptor (conductive object to be heated) is vastly reduced, typically to a few watts. At this power level, the heating of the object may continue at a very much slower rate if the susceptor thermal load is very well insulated, or begin to cool if it is not. By way of a simple switch in frequency, the heating can be stopped or nearly stopped while providing an RFID Reading frequency of 125 KHz for an RFID tag embedded in, or in proximity to, the object or material to be heated by the susceptor, i.e. in the field generated by the work coil. In this way, the same circuitry that heats the object also powers the passive RFID tag.

With the tag so powered, it can send data or code. Such passive tags do so by causing their pick-up coil to go into and out of resonance or switch between a shorted and open condition in response to the individual bits within the code or data. Either method provides a bit-variant loading on the Reader coil (in this case also the work coil). This causes the amplitude of RF voltage on the coil to vary slightly, either because the tag coil reflected amplitude or phase changes in response to the bit pattern. The process is similar to the secondary (tag) of a poorly coupled transformer being cyclically loaded and unloaded at the bit rate; the primary (reader) current or voltage will vary in like manner depending upon whether the primary is provided a constant voltage or current.

The bit rate changes in voltage or current can then be detected by any common amplitude detector such as a diode, then filtered to remove the 125 KHz carrier frequency and 60 Hz power line harmonics, amplified and then sent to a comparator to convert the data to a processor-compatible serial 1/0 bit stream. The software in the electronic processor can then act upon the data within the bit stream.

The data within the bit stream includes, but is not limited to, 1) a product ID to identify compatibility with the IH system, 2) a target temperature at which the specific product in the reader's field is to be maintained, 3) the maximum heating unit the object can report, 4) a heating profile (a 1 byte code representing a general heating profile) to insure that the product is heated at a rate that will not damage the heated substance, and 5) the current measured temperature of the substance heated.

Before any heat is applied, the electronic processor must first successfully read (by commanding the IH inverter to uot put the reader frequency (125 KHz)) the data outlined above from a tag of the field. If the electronic processor recognizes the ID and heating profile of the tag in the field, it uses the reported current and target temperature data from the tag to decide whether a heating cycle is required. If the current temperature is less than the target temperature, the IH inverter is put into a heating cycle for a period of time and at a power level determined by the profile data from the tag. The electronic processor will then periodically (as determined by the profile) switch from low frequency heat mode to high frequency read mode to gain near real time knowledge of the temperature of the item and act accordingly to control temperature as desired. If at any time, the tag data can not be read or is not considered valid, all heating is suspended until a valid tag read which calls for a heating cycle is obtained.

Alternatively, the IH system may be configured to deliver heating power at a higher frequency than the reader frequency by reducing work coil voltage and current, and therefore power at the lower Read frequency. This embodiment may be preferable for non-ferric susceptors also having fairly high bulk resistance but involves somewhat higher complexity, and therefore cost. The software in the electronic processor operates in a similar manner to the embodiment above but with the sense of the control of inverter frequency reversed.

It is also possible to heat and read using the same frequency but this is not generally preferred unless the power is reduced during the read cycle. Otherwise, the read cycles need to be shorter and farther apart in time, as the read cycles also heat the item. An advantage here, however, is that continuous temperature data is provided while heating continues, offering faster response and a very simple IH inverter and controller. In this third implementation, care must be exercised to ensure that the far higher power levels to which the tag is exposed do not thermally or electrically damage it. The electronic processor software is similar but less complicated in that the frequency and/or power level need not be controlled.

Regardless of the specific embodiment above chosen, the objects of providing a low-cost RFID reader and induction heating system are met by re-using the necessary IH components; the IH inverter becomes the RF generator, the work coil becomes the reader "antenna", the electronic processor IH controller decodes the tag ID and or temperature data, and the low voltage power supply needed for the IH inverter low-level electronics can be reused to power the data filter, amplifier, and comparator stages.

Figure 2:
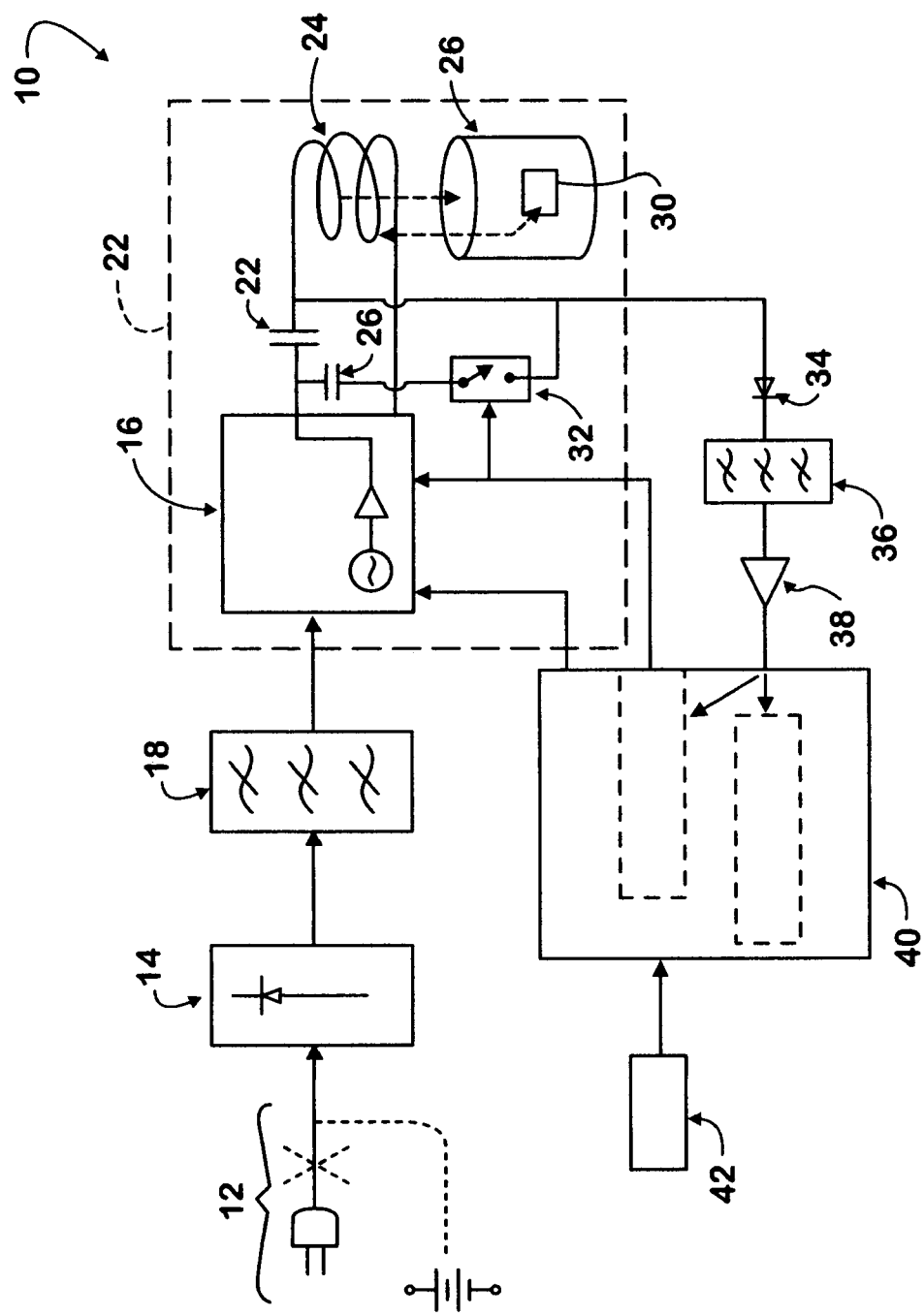
FIG. 2 is a generic circuit block diagram of the system of the present invention.
Figure 3A:
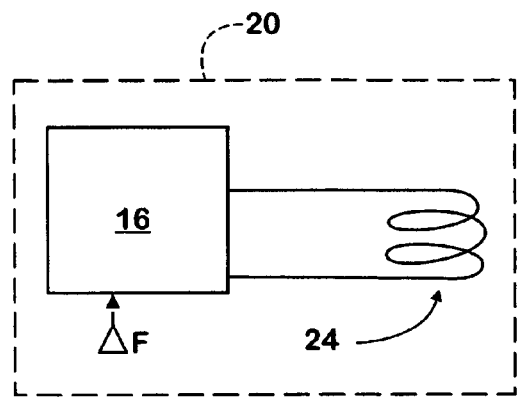
Figure 3B:
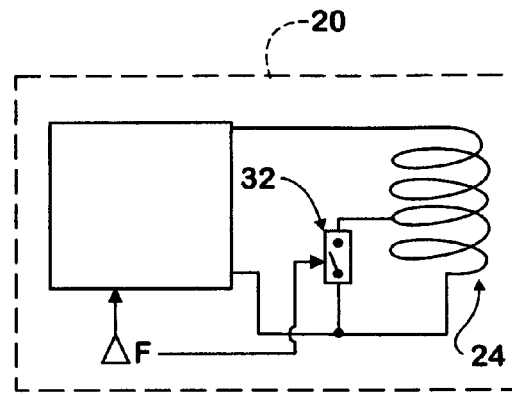
Figure 3C:
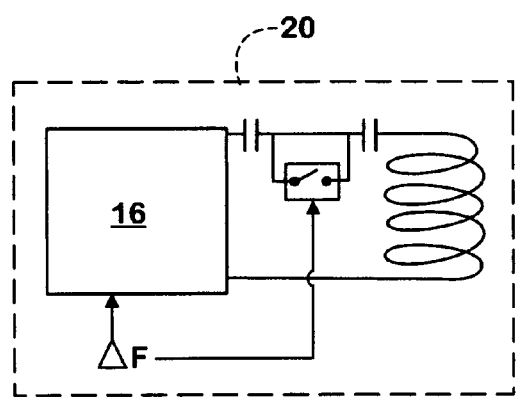
Figure 3D:
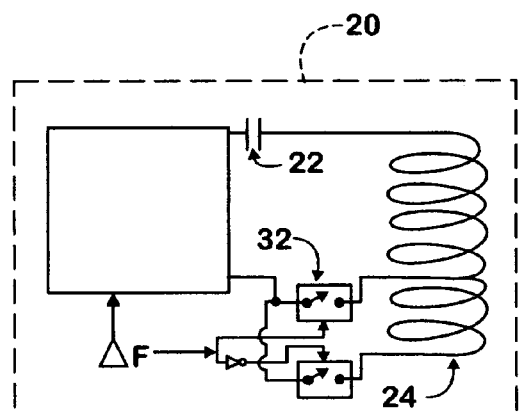
Figure 3D:
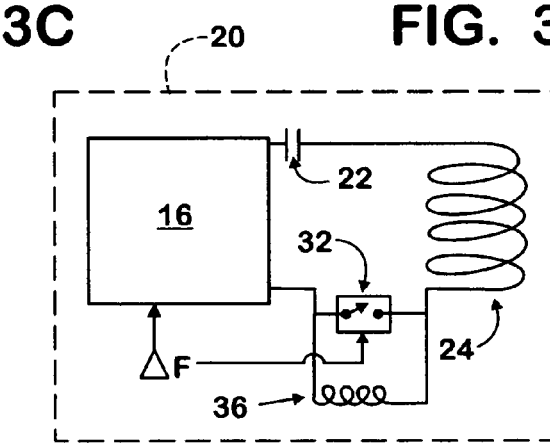
Figure 4:
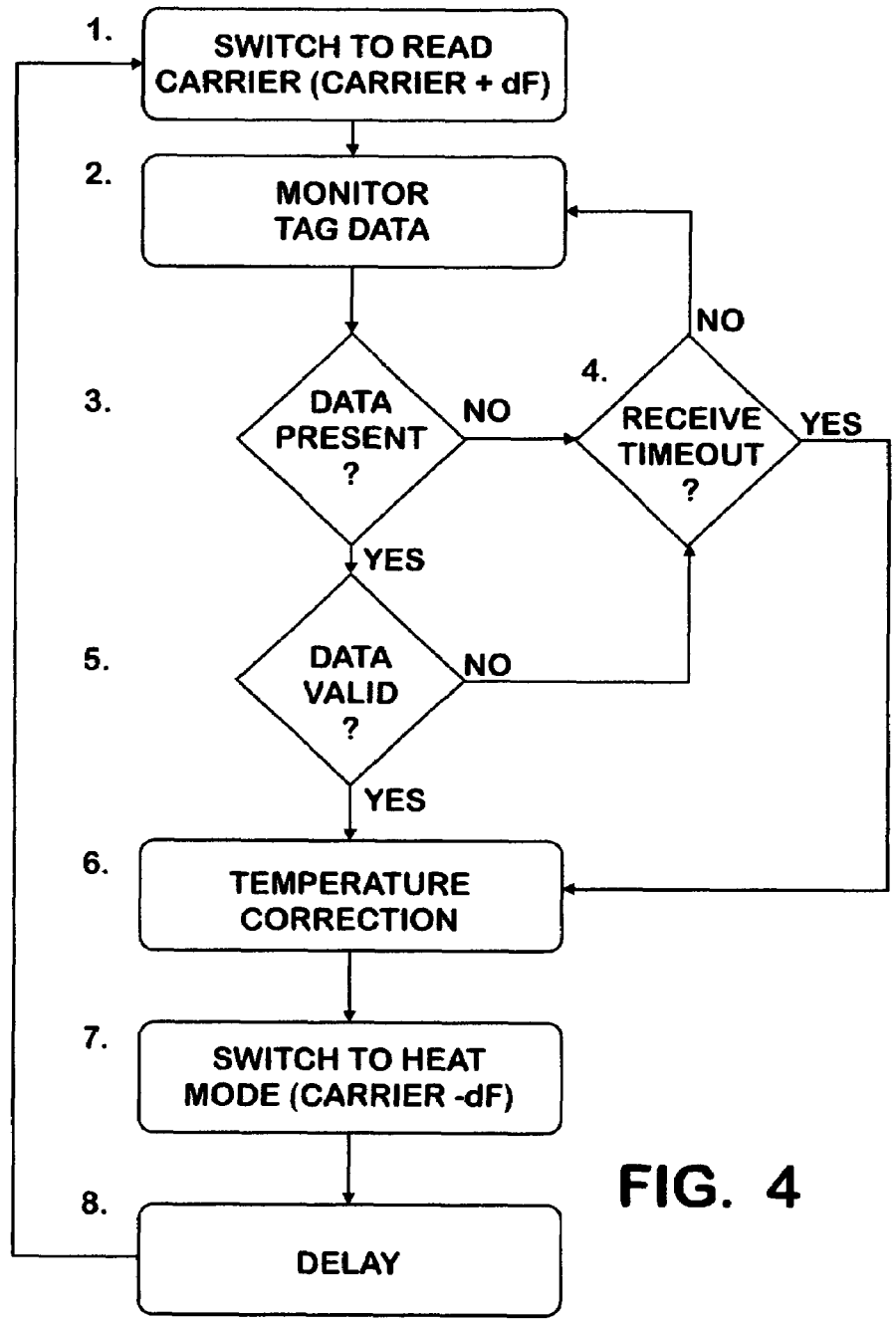
FIG. 4 is a logic flow diagram for a tag reader of the system
Figure 5:
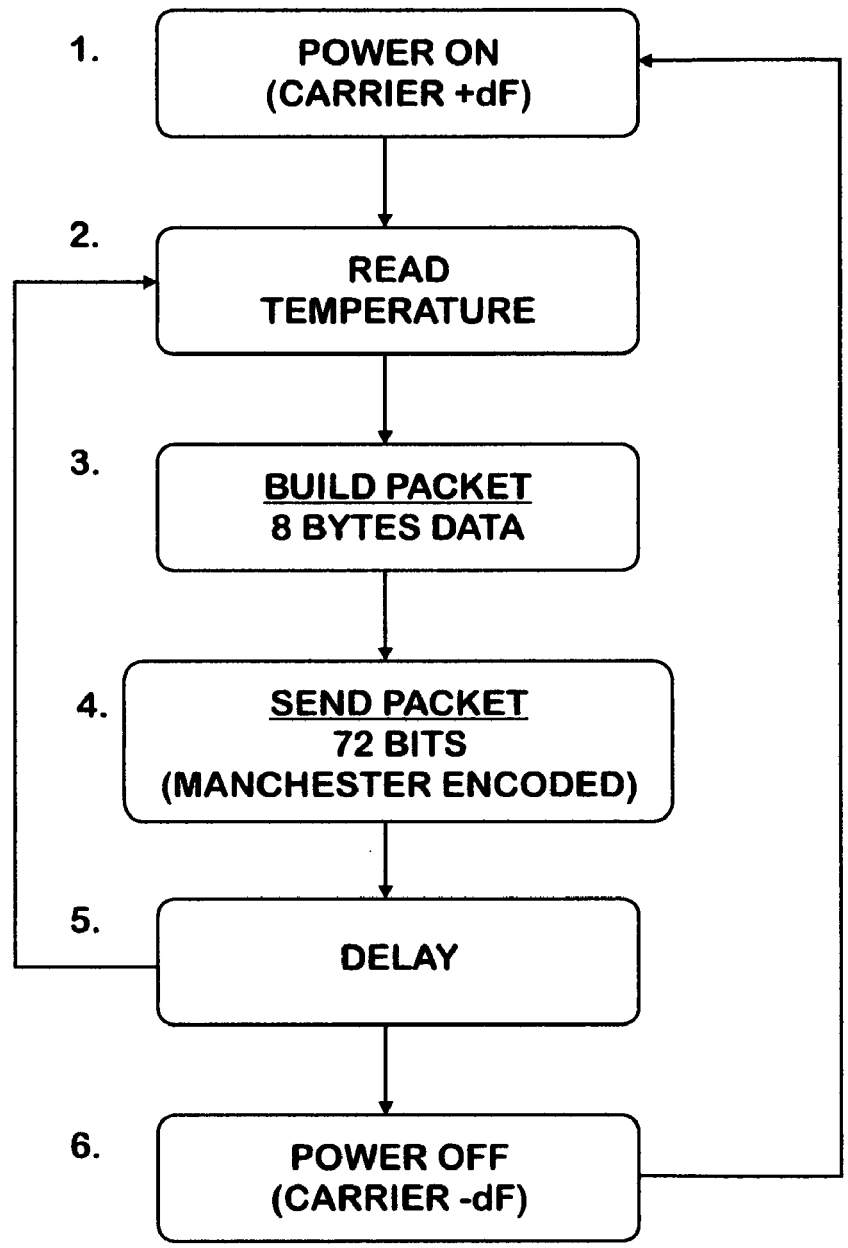
FIG. 5 a logic flow diagram for an RFID tag of the system

FIG. 2 details the inventive system 10 at hand. Beginning at the top left of the Figure, the needed electrical power source 12 can be found, normally 120/240 VAC for residential or office applications and 12 VDC for vehicular applications. In the case of DC power, the rectifier 14 can be omitted as DC is normally required for inverter 16 operation. Assuming AC power for the moment, the low pass filter 18 to the inverter 16 has two main functions, to remove the bulk of the ripple from the rectification process to provide smooth DC for the inverter 16, and to remove unwanted RF interference from back feeding into the AC power 12 line, as required by the FCC and other regulatory agencies. Depending upon the application, another low pass filter (not shown) interposed between the AC input 12 and the rectifier 14 may be needed to meet increasingly onerous regulatory agency requirements. This filter may be as simple as a single capacitor or a network of capacitors, resistors and/or inductors, as is known in the art of low pass filter design.

The inverter block 20 delivers square wave pulsating DC having an AC component at a much higher frequency than the normal 60 Hz of the power 12 line such as 20-50 KHz, as is common in induction heating applications. The exact circuitry within the inverter 16 can be as varied as the designer thereof. Common inverters 16 usually contain two MOSFETS or IGBTs in a half-bridge configuration with gate drive provided by a saturating or non-saturating torridial core connected in a feedback configuration, or more recently an oscillator/half-bridge driver I.C. such as the IR2153 by International Rectifier. In such latter configuration the frequency of the inverter oscillator, and therefore the inverter 16, may be easily changed by altering the value of either a resistor or a capacitor, and is generally preferred in this application. The inverter 16 input "frequency control" changes one of these two parameters to change the inverter 16 frequency from "heat" to "read". The inverter 16 power control may be as simple as an on/off command or may change the duty cycle or pulse width of the square wave output without changing frequency, as is known in the art of switching power supply.

The square wave thus generated is then applied to the series combination of the resonating capacitor 22 and work coil 24. The capacitor 22 serves to block the DC inverter component and to resonate the coil 24 to a frequency near the heating frequency thus increasing the volt-ampere or VA product and magnetic field of the coil 24 to better couple with and heat the susceptor/item 26 to be heated. In applications where the frequency is not changed between the read and heat cycles, the value of the resonating capacitor need not be changed. If alternate embodiments are chosen where the read frequency is either higher or lower than the heat frequency, the total value of the resonating capacitor 22 may be advantageously changed to re-resonate the coil 24 to the read frequency by switching a second capacitor 26 in series with (higher read frequency) or in parallel with (lower read frequency), the first resonating capacitor 22 to re-resonate the coil 24 to the read frequency. This may not be necessary in the case of very good coupling between the coil 24 and the RDID tag 30 but will be advantageous at longer read ranges/poorer coupling. The switch 32 may consist of an inexpensive power MOSFET or a mechanical switch such as a reed relay.

Alternatively, the value of the resonating capacitor 22 may be fixed and the value of work coil 24 inductance may be changed such as by incorporating a tap on the work coil 24 to change its number of turns and by use of one or more switches 32 (FIG. 3D) as above, to connect the inverter/detector 16 to respective heat and read inductances and therefore frequencies. The well-known equation: $F=\frac{1}{2}Pi(LC)^{\frac{1}{2}}$ illustrates how either inductance L or capacitance C may be changed to affect resonant frequency; change of capacitance generally provides a lower cost solution. In a similar manner, a separate inductance 36(FIG. 3E) may be connected in series or parallel with the work coil 24 or resonating capacitor 22 by way of switches 32 to alter the effective resonance frequency for heat and read modes having differing frequencies. Here, FIGS. 3A-3E are referred to, to show alternate embodiments suitable for use in various environments to produce the desired results. More specifically, as will be understood by those skilled in the art, non resonant circuits, such as exemplified in FIGS. 3A and 3B, or resonant circuits such exemplified shown in FIGS. 3C-3E, may be used in the system 10 in place of the inverter 16, resonating capacitor 22 and switch 32 as outlined in FIG. 2.

Regardless of the embodiment chosen, a portion of the high frequency field generated by the work coil 24 intercepts a smaller coil in the RFID tag 30, and thereby couples energy into the tag coil thus powering the tag 30 digital circuitry in the usual way (see Microchip MicroID 125 KHz Design Guide, pages 1-5, as appended in Appendix 1.) The tag 30, thus powered, sends its ID and/or temperature data back to the work coil 24 by either shorting and un-shorting or resonating and un-resonating the tag 30 coil. As described in the above reference, the data encoding may be in Manchester, non-return to zero, binary phase shift or other scheme. In any event, the data is finally sent by way of amplitude modulation or AM backscatter modulation which produces a tiny (typically 0.1 to 1%) modulation of the high frequency voltage appearing across the work coil 24.

The data-containing AM modulation so generated is detected by an conventional amplitude detector 34 such as a diode 34, then filtered at 36 to remove high frequency components, then delivered to an encoded data amplifier 38 and some form of squaring circuit to generate ONE and ZERO levels for application to the heater control electronic processor 40. Within the electronic processor 40, the received data is decoded to identify the tag 30 being interrogated, and the temperature of the tag 30. Together, this data is used by other software within the heater control electronic processor 40 to control the temperature of the item 26 to be heated as appropriate for the application. A preferred embodiment for the electronic controller 40 is a microprocessor 40. However, if a microprocessor 40 is not used and instead an electronic control 40 of ASIC, discrete, or analog nature is employed, the minimal functionality of the electronic control 40 is to decode the temperature data, compare the temperature data to a desired temperature reference and control the heating power to achieve the desired reference temperature.

The object 26 to be heated is inserted into the heater 42, as the electronic heater control 40 has been "pinging" (pinging means pulsing the work coil/IH/reader circuit 10 on at low duty cycle just enough to allow a read if there is a tag 30 inserted with product 26) in read mode waiting for the object 26. Once data coming back during a ping is sensed, the electronic 40 control goes into full read mode and obtains the ID of the item 26, decides on an appropriate heating algorithm based on the ID and, measures the current temperature; exits READ; enters HEAT; periodically reenters READ to check temperature. If the item 26 is removed from the heater 42 all incoming data stops, ping read mode is reentered, and all heating is stopped. As the temperature comes near the set point, time average power in Heat mode is reduced. Once the set point is achieved, the system 10 annunciates to the user via LEDS, beepers, etc. At 42 the system 10 goes into temperature maintain mode, or just shuts down.

Tag & Reader Flow Chart Description

The "Tag" 30 is the system 10 element that communicates temperature data to the "Reader".

The "Tag" 30 is powered by "Reader" radiated carrier energy so the "Reader" has control over when the "Tag" 30 has the capability to perform any of the intended functions within the "Tag" 30 flow chart.

Tag 30 flow chart blocks are designated as TX where 'T' denotes the "Tag" diagram and 'X' denotes the block number within the "Tag" flow chart diagram.

Likewise, Reader flow chart diagrams are designated as RX where 'R' denotes the "Reader" diagram and 'X' denotes the block number within the "Reader" flow chart diagram.

In one embodiment, the communication carrier is denoted by the heating element frequency plus an offset denoted by "dF" (delta heating frequency). In this embodiment, the Tag's 30 antenna and power source are tuned (selective to) the heating frequency plus dF. The advantage of using a higher communications frequency is the possibility of higher data rates. This produces increased complexity of carrier frequency control and radiation element design.

In another embodiment, the communication frequency and the heating frequency are one in the same (dF=0). The advantage of using the same communication frequency as heating element frequency is reduced complexity of carrier frequency control and radiation element design. This however provides lower communication data rates.

Functional Description of the Reader Flow Chart

R1.

The Reader switches the heating element frequency to that appropriate for the Tag 30 tuned antenna, and applies power to the Tag 30.

R2.

The Reader enters a "receive data" mode, attempting to recover a packet of information from the Tag 30.

R3.

If no data is received within a "timeout" period it assumes no Tag 30 is present.

R4.

If a "timeout" has not occurred, the Reader continues to listen for data at R2. If a "timeout" has occurred, the data recovery process is aborted, the current temperature data is marked as "invalid" and block R6 is entered.

R5.

If a data packet is received, the validity of the packet data is checked. The entire packet has a "checksum" appended that must be valid for all the data received in the packet and a manufacturer's ID must be valid. Thus, it must be receiving data from a known Tag 30 type. If the packet data is found to be invalid, block R4. is reentered. If the packet data is determined to be valid, the current temperature (last packet) is marked as "valid" and block R6. is entered.

R6.

If the current temperature is "valid", it is compared to the "target" temperature to decide whether further heating is required. If the current temperature is "invalid", further heating is disabled until an actionable temperature reading is received.

R7.

If further heating is required, the heating element frequency is switched to that appropriate for heating and the "inverter power control" is set to ON. This removes power from the Tag 30 if dF !=0. If further heating is not required or has been disabled (by the lack of valid data in a packet), the heating element frequency is left at the Tag 30 receive frequency or, is set to the heating frequency with an "inverter power control" being set to OFF.

R8.

Further action is delayed while the Reader attends to other matters such as user input. The temperature data cycle is restarted (R1.).

Functional Description of the Tag 30 Flow Chart T1.

The Reader switches the frequency to that of the tuned antenna of the Tag 30. Power is applied to the Tag 30 and an initialization is performed.

T2.

An analog to digital (A/D) conversion is performed on a temperature sensitive element in the Tag 30 to determine the temperature of the Tag 30.

T3.

A transmission data packet is compiled that includes Tag 30 version information, vendor and product information, a Tag 30 serial number, the temperature data, and a checksum value to assist the reader in determining if a transmission error has occurred.

T4.

The transmission data packet is sent to the Reader, with appropriate physical channel data encoding.

T5.

A fixed delay is entered to allow the Reader to process the data received in the packet. If the Reader has changed frequency and there is no power for further operation, block T6. is entered. Otherwise, block T2. is entered to repeat the cycle.

T6.

Power to the Tag 30 has been removed. When power is re-applied by the Reader switching to the Tag 30 tuned antenna frequency, block T1. is again entered.

We claim:

1. An induction heating and RFID system which is electronically controlled and wherein a work coil high frequency magnetic field both heats an item to be heated either directly or by way of a thermally coupled susceptor, and powers and activates a radio frequency identification tag, said tag when activated producing serial digital backscatter modulation of the magnetic field, to provide ID data of the item, and/or the temperature of the item, and/or other desired physical parameters of the item.

2. The induction heating and RFID system according to claim 1 in which the frequency of the work coil magnetic field has two frequency states, one state to heat the item, and the other to activate the RFID tag.

3. The induction heating and RFID system according to claim 1 in which the work coil high frequency magnetic field has two distinct power states, a high power state to heat the item while activating the tag, and a low power state to activate the RFID tag while providing little or no item heating.

4. An induction heating system for heating an item which is electronically controlled, said system containing a work coil and an RFID tag wherein serial digital backscatter data modulation produced by the tag is received by the work coil, detected in a detector, filtered in a data filter, amplified by a data amplifier and sent to a data decoder for operating the heating system to heat the item to a desired temperature.

5. The induction heating system according to claim 4 wherein received tag data is received in packets and, when decoded in the decoder, enables a heating cycle to begin.

6. The induction heating and RFID system according to claim 5 wherein received tag data includes item temperature data which, when decoded, controls the average power delivered to the work coil so as to provide the desired item temperature.

7. The induction heating system according to claim 6 in which a microprocessor controller is configured to decode the data from the tag, and to control the average power of the high frequency inverter in response to the decoded data.

* * * * *